(12) United States Patent
Goldman et al.

(10) Patent No.: US 7,369,584 B2
(45) Date of Patent: May 6, 2008

(54) LASER PROJECTION DISPLAY

(75) Inventors: Ron Goldman, Cold Spring Harbor, NY (US); Paul Dvorkis, E. Setauket, NY (US); Joseph Katz, Stony Brook, NY (US); Narayan Nambudiri, Kings Park, NY (US); Miklos Stern, Woodmere, NY (US); Chinh Tan, Setauket, NY (US); Carl Wittenberg, Water Mill, NY (US); Frederick F. Wood, Medford, NY (US); Dmitriy Yavid, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 262 days.

(21) Appl. No.: 10/883,479

(22) Filed: Jun. 30, 2004

(65) Prior Publication Data

US 2005/0140832 A1    Jun. 30, 2005

(51) Int. Cl.
*H01S 3/10* (2006.01)
(52) U.S. Cl. .................................. 372/24; 348/764
(58) Field of Classification Search ................ 372/24
See application file for complete search history.

(56) References Cited

U.S. PATENT DOCUMENTS

| | | | | |
|---|---|---|---|---|
| 6,056,406 | A  * | 5/2000 | Park | 353/94 |
| 6,266,048 | B1 * | 7/2001 | Carau, Sr. | 345/168 |
| 6,590,606 | B1 * | 7/2003 | Hiller et al. | 348/203 |
| 2004/0017518 | A1 * | 1/2004 | Stern et al. | 348/744 |

OTHER PUBLICATIONS

International Search Report PCT/US2004/042836 dated Mar. 21, 2005.

* cited by examiner

*Primary Examiner*—Dung (Michael) T. Nguyen
(74) *Attorney, Agent, or Firm*—Kirschstein, et al.

(57) ABSTRACT

A method and apparatus are provided for controlling the operation of a Laser Projection Display (LPD). Generally, the LPD is comprised of a laser, an optical system and a controller. The laser is adapted to emit a beam of laser light. The optical system is adapted to scan the beam of laser light on a display surface in a two-dimensional raster pattern. The controller is adapted to control the rate at which the laser beam is scanned to produce regions of varying resolution on the display surface. The controller is also adapted to present laser light onto the display surface within only selected portions of the two-dimensional raster scan pattern so that spaced apart image regions may be created.

20 Claims, 15 Drawing Sheets

LASER PROJECTION DISPLAY

BACKGROUND OF THE INVENTION

1. Field of the Invention

This invention relates generally to electronic displays, and, more particularly, to a Laser Projection Display (LPD).

2. Description of the Related Art

A wide variety of electronic devices are available on the market today. Many of these devices interface with consumers visually. That is, many consumer electronic devices, such as desktop computers laptop, computers, notebooks, televisions, Personal Digital Assistants (PDAs), radios, MP3 players, automobile dashboards, cellular telephones, watches, audio equipment, etc. present information to a consumer via a display screen. These display screens may take a wide variety of forms, including Cathode Ray Tubes (CRTs), Liquid Crystal Displays (LCDs), plasma displays, Light Emitting Diodes (LEDs), projectors, and the like.

Generally, these displays have a uniform continuous shape, usually rectangular, and heretofore their shape has not been readily adjustable or adaptable. Rather, the consumer products have been configured to adapt to the uniform shape of the display screen. That is, a consumer electronic device is commonly designed to have a housing with a relatively large, flat area that receives a conventionally shaped display device. Little or no consideration has been given to the idea of conforming the display screen to a functional or aesthetic shape dictated by the function or use of the product.

Moreover, not only do display screens typically have a uniform, generally flat configuration, deviations from this configuration are problematic. Projecting an image onto a non-uniform display screen will normally result in undesirable distortion of the image. For example, projecting an image onto a display screen that has irregular or non-flat areas will result in the projected image being distorted in the region of the irregularity or non-flat area.

Additionally, in consumer devices where two or more display screens may be useful, it is typical to provide two separate, but functionally identical, display screens. Providing two functionally identical display screens, of course, is prohibitively expensive.

The present invention is directed to overcoming, or at least reducing, the effects of one or more of the problems set forth above.

SUMMARY OF THE INVENTION

In one aspect of the instant invention, an apparatus is provided for displaying an image. The apparatus comprises a laser, an optical system and a controller. The laser is adapted to emit a beam of laser light. The optical system is adapted to scan the beam of laser light on a display surface in a two-dimensional raster pattern, and the controller is adapted to vary the rate at which the laser beam is scanned in at least one of the dimensions of the two-dimensional raster pattern.

In another aspect of the instant invention, an apparatus is provided for displaying an image. The apparatus comprises a laser, an optical system and a controller. The laser is adapted to emit a beam of laser light. The optical system is adapted to scan the beam of laser light on a display surface in a two-dimensional raster pattern, and the controller is adapted to control the rate at which the laser beam is scanned to produce regions of varying resolution on the display surface.

In still another aspect of the instant invention, an apparatus is provided for displaying an image. The apparatus comprises a laser, an optical system and a controller. The laser is adapted to emit a beam of laser light. The optical system is adapted to scan the beam of laser light on a display surface in a two-dimensional raster pattern, and the controller is adapted to present laser light onto the display surface within only selected portions of the two-dimensional raster scan pattern.

In yet another aspect of the instant invention, a method is provided for displaying an image. The method comprises scanning a beam of laser light on a display surface in a two-dimensional raster pattern, and varying the rate at which the laser beam is scanned in at least one of the dimensions of the two-dimensional raster pattern.

In another aspect of the instant invention, a method is provided for displaying an image. The method comprises scanning a beam of laser light on a display surface in a two-dimensional raster pattern, and controlling the rate at which the laser beam is scanned to produce regions of varying resolution on the display surface.

In another aspect of the instant invention, a method is provided for displaying an image. The method comprises scanning a beam of laser light on a display surface in a two-dimensional raster pattern, and presenting laser light onto the display surface within only selected portions of the two-dimensional raster scan pattern.

BRIEF DESCRIPTION OF THE DRAWINGS

The invention may be understood by reference to the following description taken in conjunction with the accompanying drawings, in which like reference numerals identify like elements, and in which.

Figure 1:
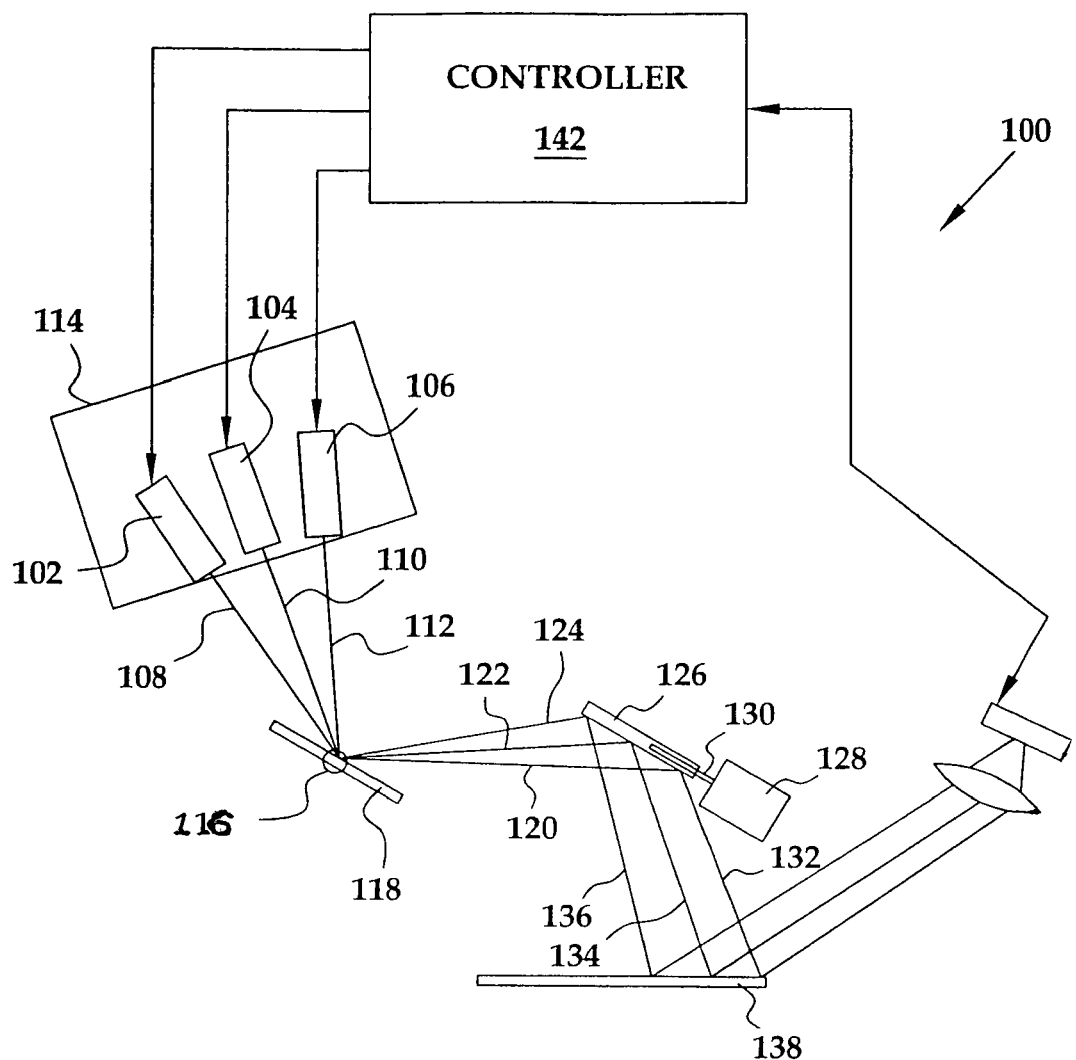
FIG. 1 is a stylistic block diagram of a top level view of a Laser Projection Display (LPD)

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a stylistic block diagram of a laser projection display (LPD) 100, in accordance with one embodiment of the present invention, is shown. In the illustrated embodiment, the LPD 100 includes three lasers 102, 104, 106, each capable of emitting a beam of light 108, 110, 112 consisting of a unique color, such as red, green or blue. Those skilled in the art will appreciate that the number of lasers and the color of light emitted therefrom may be varied without departing from the spirit and scope of the instant invention.

The lasers 102, 104, 106 are arranged in a common plane 114 with the beams of light 108, 110, 112 being angularly directed relative to one another to fall on a substantially common location 116 on a first scanning device, such as a first scanning mirror 118, from where they are reflected as beams of light 120, 122, 124. In the illustrated embodiment, the first scanning mirror 118 oscillates on an axis at a relatively high rate (e.g., about 20-30 KHz). Rotation or oscillation of the first scanning mirror 118 causes the beams of light 108, 110, 112 to be moved. That is, as the angular position of the first scanning mirror 118 alters, so too does the angle of reflection of the beams of light 120, 122, 124 from the first scanning mirror 118. Thus, as the mirror oscillates the reflected beams of light 120, 122, 124 are scanned to produce movement of the beams of light 120, 122, 124 along one component of the two-dimensional display.

The second component of the two-dimensional display is produced by a second scanning device, such as a mirror 126. In the illustrated embodiment, the second mirror 126 is coupled to a motor 128 at a pivot point 130 so as to produce rotational or oscillating movement about an axis that is substantially orthogonal to the axis of rotation of the first mirror 118. The beams of light 120, 122, 124 are reflected off of the second mirror 126 as beams of light 132, 134, 136 and directed to a viewing surface 138. The viewing surface 138 may take on any of a variety of forms without departing from the spirit and scope of the instant invention. For example, the viewing surface 138 may be a fixed screen that may be front or back lit by the lasers 102, 104, 106 and may be contained in a housing (not shown) that is common with the LPD 100, or alternatively, the viewing surface 138 may take the form of any convenient, generally flat surface, such as a wall or screen, spaced from the LPD 100.

Figure 2:
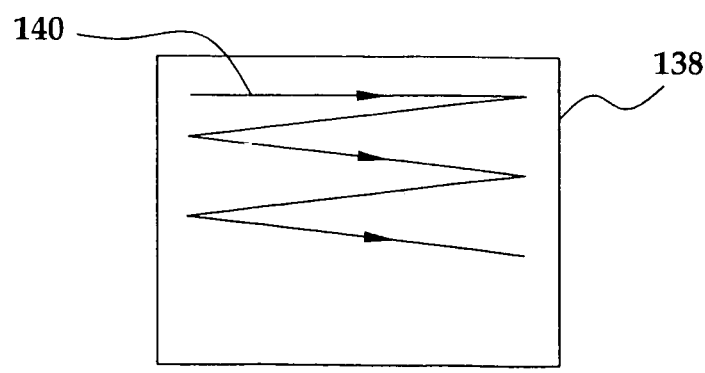
FIG. 2 is a stylistic view of a viewing surface shown in FIG. 1.

The second mirror 126 oscillates or rotates at a relatively slow rate, as compared to the rate of the first mirror 118 (e.g., about 60 Hz). Thus, it will be appreciated that, as shown in FIG. 2, the beams of light 132, 134, 136 generally follow a path 140 on the display surface 138. Those skilled in the art will appreciate that the path 140 is similar in shape and concept to a raster scan commonly employed in cathode ray tube televisions and computer monitors.

While the instant invention is described herein in the context of an embodiment that employs separate first and second scanning mirrors 118, 126, those skilled in the art will appreciate that a similar path 140 may be produced by using a single mirror. The single mirror would be capable of being moved about two axis of rotation to provide the fast and slow oscillating movements along two orthogonal axes.

As is apparent from FIG. 1, owing to the angular positioning of the lasers 102, 104, 106, even though the lasers 102, 104, 106 have been arranged mechanically and optically to deliver the beams of light 108, 110, 112 within the same plane 114 and at the same point 116 on the rotational axis on the mirror 118, each has a different angle of reflection, which causes the beams of light 120, 122, 124 to diverge. A controller 142 is provided to controllably energize the lasers 102, 104, 106 to effectively cause the beams of light 120, 122, 124 to be collinear, such that they may be reflected off of the second mirror 126 and delivered to the same point on the viewing surface 138 relatively independent of the distance of the viewing surface 138 from the second mirror 126.

Figure 3A:
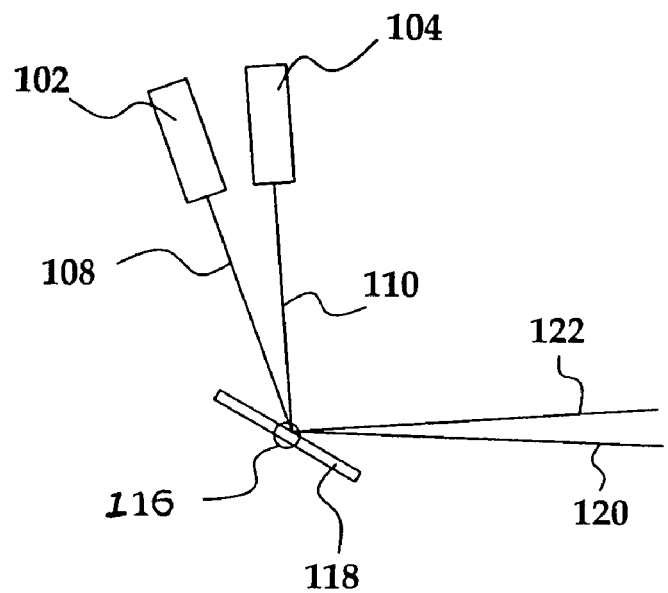
FIGS. 3A and 3B depict a top view of a scanning device at various times during its operation.
Figure 3B:
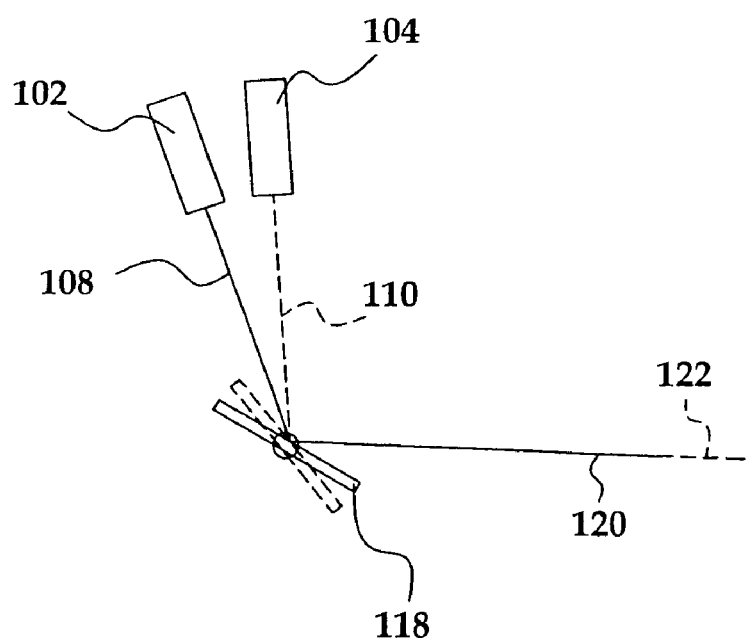

Turning now to FIGS. 3A and 3B, the operation of the controller 142 to cause the beams of light 120, 122, 124 to be collinear is discussed. To simplify the discussion, only two lasers 102, 104 are illustrated in FIG. 3, but those skilled in the art will appreciate that the concepts discussed herein may be extended to three or more lasers without departing from the spirit and scope of the instant invention. As shown in FIG. 3A, if the lasers 102, 104 are energized simultaneously, the reflected beams of light 120, 122 diverge. However, as shown in FIG. 3B, if the lasers 102, 104 are energized at slightly different times, then the beams of light 120, 122 can be made to follow a single, common path (i.e., the beams of light 120, 122 are collinear). For example, if the laser 102 is energized at a first time t1, then the mirror 118 will be at a first position, as represented by the solid lines, and the beam of light 108 will reflect off of the mirror 118 as the beam of light 120. Subsequently, if the laser 104 is energized at a second time t2, then the mirror 118 will be at a second position, as represented by the dashed lines, and the beam of light 110 will reflect off of the mirror 118 as the beam of light 122. By precisely controlling the time t2, the mirror 118 will be in a position to accurately reflect the beam of light 122 along substantially the same path as the beam of light 120.

Thus, through the operation of the controller 142, the beams of light 120, 122 are substantially collinear, but are slightly displaced in time. That is, the beams of light 120, 122 will now both be projected onto substantially the same point on the display surface 138, but at slightly different times. However, owing to the persistence of the human eye, the variation in timing is not detectable. That is, in the case of the three laser system described in FIG. 1, each of the lasers 102, 104, 106 will controllably deliver laser light of a unique color and intensity to substantially the same point on the viewing surface 138 within a relatively short window of time. The human eye will not detect the three separate colors, but rather will perceive a blending of the three light beams such that a consistent and desired hue appears at that point on the viewing surface. Those skilled in the art will appreciate that this process may be repeated numerous times along the path 140 to recreate a picture on the viewing surface 138.

By controlling the rate and range of movement of the mirrors 118, 126, the LPD 100 can display on non-uniform shape screens and display on multiple discontinuous display surfaces. The extent of the capability is a function of the type of control exerted over the scanning mirrors 118, 126. Each of the mirrors 118, 126 can be either resonant (single frequency oscillation) or non-resonant (driven and varied frequencies).

Figure 4:
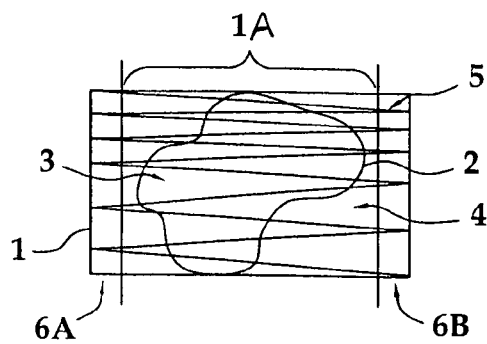
FIG. 4 depicts a stylized view of a display screen in which only a portion of the screen is illuminated with laser light.

In the case where the mirrors 118, 126 are both resonant (each driven at a single frequency), non-uniform shape displays can be formed by blanking the display during the time period the lasers are aimed outside of a desired viewing area. More particularly, referring to FIG. 4, the X and Y mirrors will move the projection of the lasers along the scan lines 5 within an area 1. Due to the non-linear nature of the mirror motion at the ends of the X direction scanning, the areas at the ends of the X direction scanning (6A and 6B) are not available for display (for example, when generating a rectangular display the laser is normally blanked (kept off) during the beginning and end of a X scan line). Accordingly, blanking the lasers during the times at which the lasers are aimed outside of the desired display shape can result in any shape display 2 within the viewable area 1A.

Figure 5:
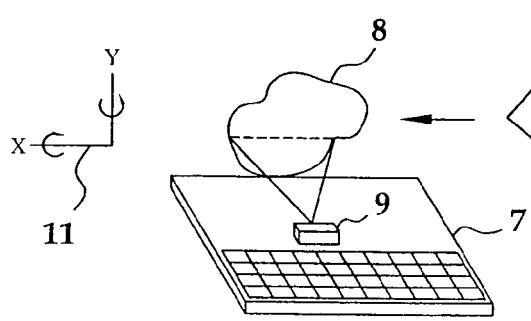
FIG. 5 depicts a stylized view of an LPD arranged to project light onto an irregular display screen.

FIG. 5 shows an embodiment in which an LPD 9 projects an image on an irregular shaped screen 8. In this embodiment, a computer 7 is functionally and physically associated with the LPD 9 to project images on the irregular shaped screen 8. The screen 8 can be either fixed to the computer 7 or may be removable. It is also possible, given the fact that the LPD 9 can be configured to capture images (as set forth in co-pending application No. 60/534,005, filed on Dec. 31, 2003, which is hereby incorporated herein in its entirety), to auto detect when a laser beam is striking the screen 8, and make appropriate adjustments to the blanking periods for the laser. More particularly, referring back to FIG. 4, during the setup period, for each pixel within the potentially viewable area 1A, the LPD projects the laser and detects whether the reflected signal correlates with that expected when striking a screen material. A table may be constructed in memory, which correlates with the shaped display 2. Only when the laser is pointing inside the shaped display 2 is the laser energized. Referring back to FIG. 5, if the user decides to replace shaped screen 8 with alternative shaped screen 10, an auto detect cycle can be initiated to reset the memory table to correlate with alternative shaped screen 10. Alternatively, the detect cycle can occur periodically so that the user does not have to manually inform the computer that the screen has been changed.

The detection cycle described in the preceding paragraph can also be used when a given shaped screen 8 is moved relative to the LPD projector 8. For example, if the screen 8 is rotated about the X-axis or Y-axis 11 to maximize user view ability, the apparent shape of the screen 8 as viewed from the LPD 9 changes. The detection cycle can be utilized to reshape the projected image so that it falls solely on the screen 8. Also, the mirrors 118, 126 may be controlled or adjusted to compensate for the resulting angle between the LPD and the screen 8. The detection of the angle of the screen 8 can be via physical sensors measuring the angle between the screen 8 and the projector, or alternatively, can be done via imaging by the LPD 9. More particularly, in the case of imaging, if the original shape of the screen 8 is known (stored in the memory of the LPD or computer), by comparing the imaged view of the screen with the original shape of the screen in memory, o the angle of the screen 8 relative to the position of the LPD 9 can be mathematically calculated.

Figure 6:
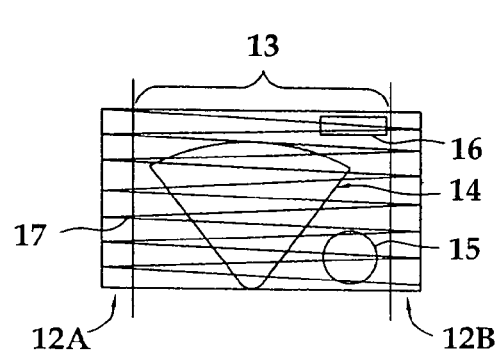
FIG. 6 depicts a stylized view of a display screen in which only select spaced-apart portions of the screen are illuminated with laser light.

FIG. 6 addresses using two resonant mirrors (X and Y) to form discrete displays from a single LPD. As in FIG. 2, the LPD is capable of projecting in potentially viewable area 13. By defining (logically in memory), unique and discrete shaped areas 14, 15 and 16, the LPD can be turned off or otherwise restricted from projecting outside of the discrete shaped areas 14, 15 and 16. It this example, for illustrative purposes, the area 14 is a baseball diamond, area 15 is the on deck batters circle and area 16 is the scoreboard.

Figure 7:
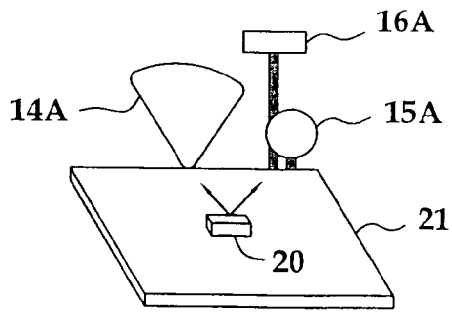
FIG. 7 depicts a stylized view of an LPD arranged to project light onto a plurality of discrete irregular display screens.

While FIG. 6 showed the various discrete shaped areas 14, 15 and 16 on a single surface, this invention is not limited thereto. FIG. 7 shows a video game 21 using screen areas 14A, 15A and 16A, which are similar to those shown in FIG. 4. In this case, each screen is physically separated and individually mounted. Accordingly, an LPD 20 will project an image on each of the screen areas. One can envision a baseball game in which the video playing action is viewed on the screen 14A, while the score is displayed on the screen 16A and the video picture of the next batter due to hit is viewed on the screen 15A. In this FIG. 7 embodiment, the laser is blanked (turned off or blocked) when it is aimed at a position other than at the screen areas 14A, 15A or 16A.

Figure 8:
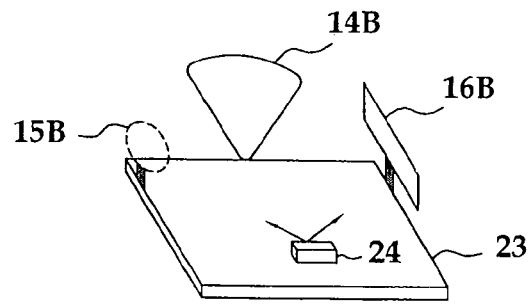
FIG. 8 depicts a stylized view of an LPD arranged to project light onto a plurality of discrete irregular display screens that are arranged in a non-coplanar configuration.

While FIG. 7 showed the various discrete shaped areas 14A, 15A and 16A as separate displays mounted with their viewing surface coplanar, the invention is not limited thereto. FIG. 8 shows a video game 23 using a plurality of screen areas 14B, 15B and 16B, which are similar to those shown in FIG. 6. In this case, each screen is physically separated and individually mounted and at different viewing angle to each other. This allows for a compact product having those items that are less relevant, or less frequently viewed, mounted on the less desirable viewing angles.

As previously discussed relative to FIG. 5, it is possible to configure an LPD to detect when the LPD is projecting on a screen and to adjust the projection so that only the desired locations are illuminated. In FIG. 8, this concept can be extended to the multiple discrete screens 14B, 15B and 16B. Accordingly, the LPD 24 can detect the location of the screens 14B, 15B and 16B within the projected field of view and adjust its memory so that it only illuminates the screens (does not project unless aimed at a screen). Further, the angle of each of the screens relative to the LPD can be detected, and the image associated with each of the screens can be digitally skew adjusted in memory so that the image on all of the displays 14B, 15B and 16B are properly aligned with the displays.

In all the prior discussions (FIGS. 4-8), two resonant mirrors were used (one for the X axis scanning and one for the Y axis scanning). For a two resonant mirror system, an optimal display area (e.g., a shape holding the maximum number of pixels) is rectangular (or square). This is due to the fact that each mirror resonates at a given frequency and can not be dynamically adjusted. When utilizing resonant X and Y mirrors to form complex shapes or multiple screens (as shown in FIGS. 4-8) those pixels in the blanked areas are lost and cannot be recovered. Accordingly, the total number of pixels displayed in a complex or multi-screen environment is less that the number of pixels that would be displayed in a rectangular area.

Figure 9:
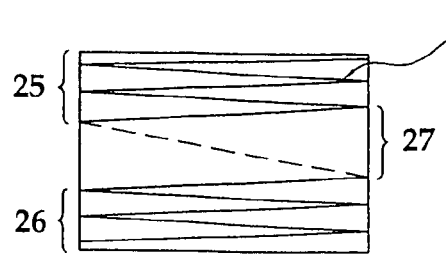
FIG. 9 depicts a stylized view of a display screen having a plurality of display regions with varying resolutions.

FIG. 9 shows an illustrative scanning from an LPD having a resonant X mirror and a non-resonant Y mirror. The non-resonant scanning Y mirror has a frequency in the range between zero and several hundred hertz. Symbol Technologies' TBE scan motors are well suited for providing such non-resonant scanning. FIG. 9 shows a display broken into three discrete sections. In areas 25 and 26 the laser projection 28 is tightly rastered and selectively energized to form higher resolution viewable images. In these areas 25 and 26, the Y direction mirror moves at a relatively constant rate low rate (e.g., 60 Hz), thereby providing displays areas having approximately the same pixel density. In area 27, the Y mirror is driven at a higher frequency (several hundred hertz), to move the aim of the laser from the end of area 25 to the beginning of section 26 relatively rapidly. The laser may be blanked during the time in which it is traversing area 27. In this manner, two discrete viewing areas 25 and 26 can be formed, spatially separated from each other, without losing pixels as would happen in a system having two resonant mirrors projecting viewable areas 25 and 26.

Figure 10:
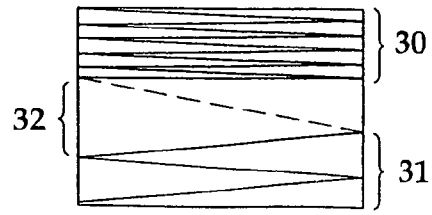
FIG. 10 depicts an alternative embodiment of a stylized view of a display screen having a plurality of display regions with varying resolutions.

FIG. 10 shows yet a further capability of an LPD having a resonant X mirror and a non-resonant Y mirror. FIG. 10 is similar to FIG. 9 except that the pixel density of a display area 31 can be arranged to be less than an area 30. This is accomplished by moving the Y mirror faster while projecting the image in area 30. By way of example, assuming that the X mirror moves at a constant frequency, if the Y mirror moves at 60 Hz in area 30, and 120 Hz in area 31, the pixel density in area 31 is half that of the density in area 30. The following is an illustrative use of a screen having multiple areas with different pixel densities. When operating a computer with the Windows® operating system, often the top or bottom of the screen is reserved for menu options. These menu options do not require high pixel density. Accordingly, the menu areas of the screen can be set to have low pixel density while the remainder of the screen displays in a high pixel density mode. Alternatively, the Windows® operating system allows the user to open up and display multiple windows concurrently. Assuming a user opens up a graphics program, requiring high pixel resolution, and a text program, requiring lower resolution, the LPD can dynamically adjust the resolution provided in the viewable portion of each window opened by the user.

Figure 11:
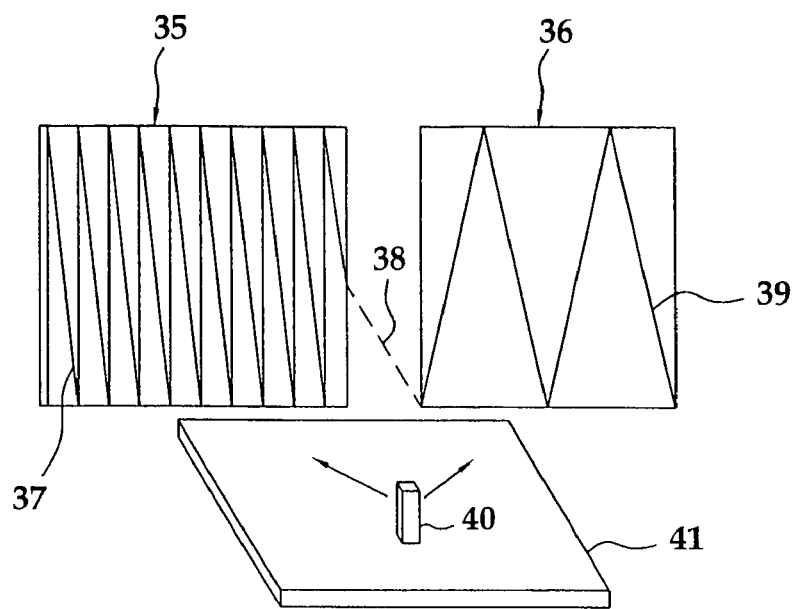
FIG. 11 depicts a stylized view of spaced apart display screens that are illuminated by a common LPD at varying resolutions.

FIG. 11 shows a alternative embodiment utilizing the principles discussed in FIG. 8 and FIG. 10. A computer 41 is shown having an LPD 40 mounted on its side (i.e., rotated 90 degrees relative to the orientation of the LPD of FIGS. 8 and 10) so that the Y direction of projecting the laser is horizontal in the drawing. Two discrete screens are 35 and 36 are provided. The raster pattern is generated by a resonant X mirror and a non-resonant Y mirror. When projecting on screen 35, the Y mirror is moved at, for example, 60 Hz, thereby providing a higher resolution screen. At the end of projecting on screen 35 (right hand side of 35) the Y mirror is accelerated to, for example, several hundred hertz, until reaching the beginning of display 36. When projecting on display 36 the Y mirror is moved at 120 Hertz resulting in a lower density display.

An example of two screen operation, where different screen resolutions might be relevant, is picture editing. In this case, a high resolution view of the picture can be displayed on screen 35. The menu options, which do not require high resolution, can be displayed on display 36.

The two-screen embodiment of FIG. 11 can also utilize the scanning shown in FIG. 9. In this case, screens 35 and 36 each will have the same pixel resolution.

Figure 12:
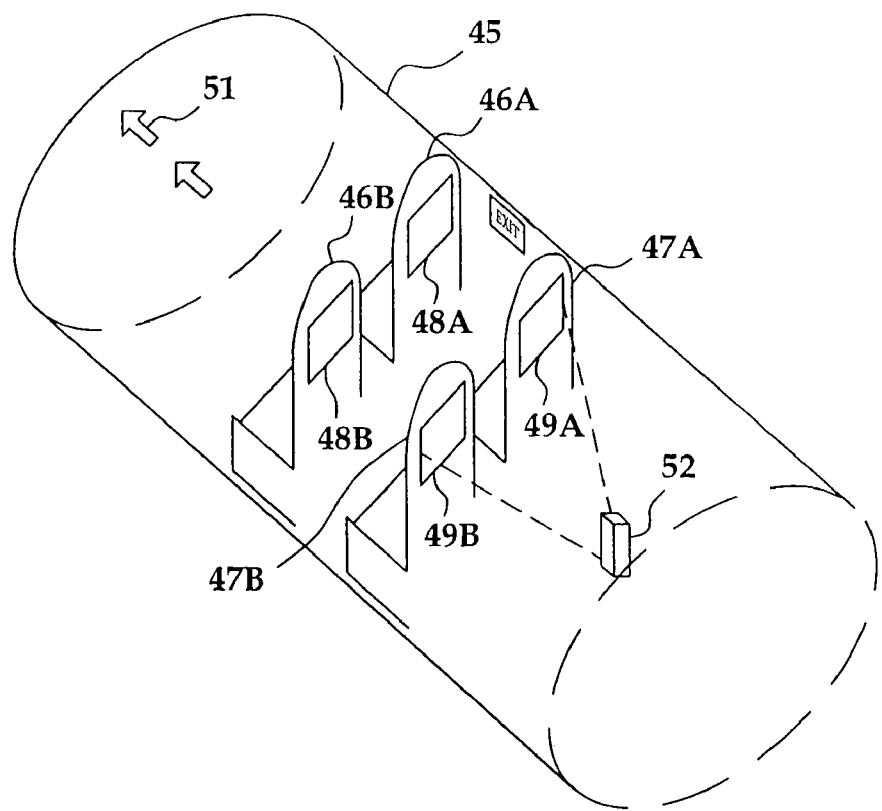
FIG. 12 depicts a stylized view of an airplane passenger compartment with spaced apart display screens that are illuminated by a common LPD.

FIG. 12 illustrates a different use for an LPD having a resonant X mirror and a non-resonant Y mirror. In this example, seats 47A and 47B of an airplane 45 have surfaces 49A and 49B suitable for projecting an LPD display thereon. A single LPD 52 can be mounted so that the Y scanning angle is along the horizontal axis of the plane. By utilizing the scanning methodology discussed in FIG. 9, two different images can be projected on the back of each of the chairs 49A and 49B. In this manner, for example, two passengers can simultaneous view different movies projected from a single LPD. Alternatively, if each user has a control panel connected to a computer source driving the output of the LPD, each passenger can interactively play video game against each other, wherein each screen can show a different gaming angle or situation.

Figure 13:
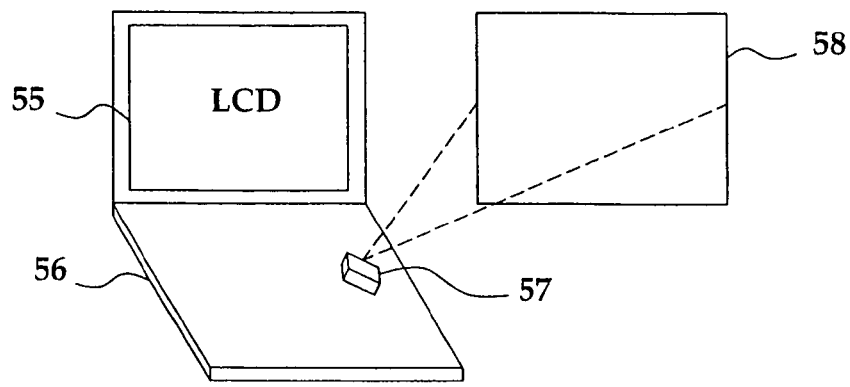
FIG. 13 depicts a computer system with dual display capability using an LCD display screen and an LPD.

FIG. 13 illustrates a hybrid product, incorporating both a standard LCD screen 55 and an LPD 57 and a screen 58 (either attached or projected on a surface). In this case, for example, if the product is a computer, there exist many programs which concurrently utilize dual monitors. This FIG. 13 embodiment allows a user of a standard computer having an LCD to obtain the second display without having the physical challenges associated with carrying or incorporating a second display. A second use for a portable computer having the configuration of FIG. 13 is to utilize the LPD 57 to project an image on a surface 58 to be viewed by an audience, while the LCD screen 55 has the same or different content by the presenter (operator of the computer). This can be particularly helpful to a presenter where speaking notes are on the LCD screen and the presentation (power-point, video, etc.) is projected by the LPD 57.

When the LPD is projected onto a transflective surface (e.g., a surface which reflects some of the light and passes some of the light) the image can be viewed from both sides of the screen. Examples of transflective materials are standard white paper, latex, frosted glass, textured lexan, plastics, etc.). Further, the viewing angle from each side is 180 degrees. This provides for a virtually 360 degree viewable display.

Figure 14:
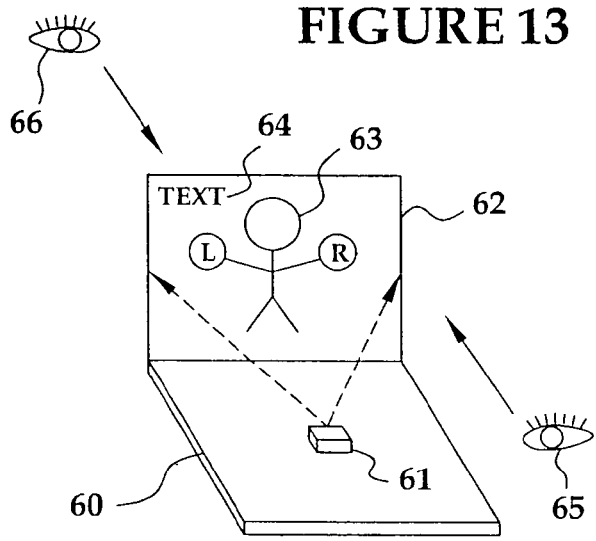
FIGS. 14 and 15 depict a stylized view of a computer system with an LPD and a display screen that is viewable from both front and back sides.
Figure 15:
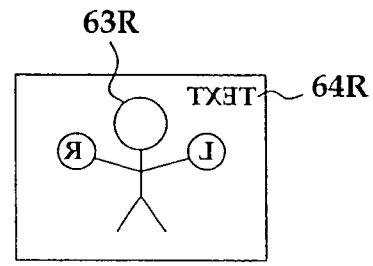

FIG. 14 shows an embodiment of a product 60 having a transflective surface 62 upon which the LPD 61 projects an image. In this example, a text message 64 and a graphical image 63 are shown. When viewing the screen 62 from the front 65, the image is viewed in a normal (non-reversed manner). FIG. 15 shows the same image viewed from position 66 in FIG. 14. As can be seen, both the graphical image 63R and the text 64R appear reversed. In cases where only graphical images are present, this reversal may not matter. However, it the case of text display, this reversal is unacceptable.

Figure 16:
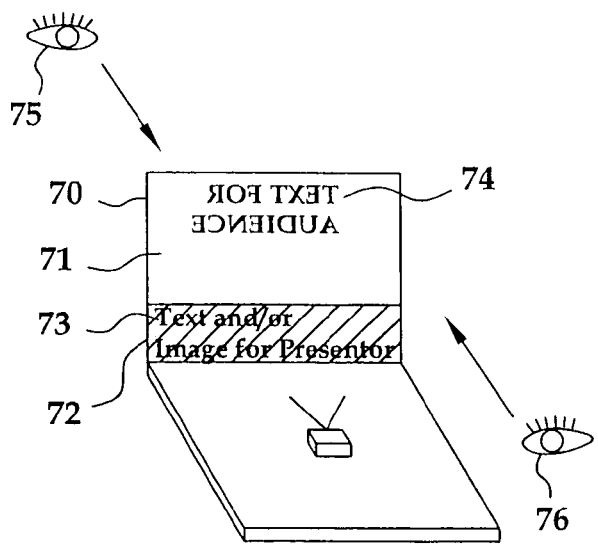
FIGS. 16 and 17 depict a stylized view of an alternative embodiment of a computer system with an LPD and a display screen that is viewable from both front and back sides.
Figure 17:
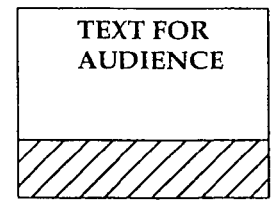

FIG. 16 shows an embodiment that will allow two-sided viewing and addresses the image reversal problem of FIG. 14. In FIG. 16, the screen 70 consists of a portion 71 that is transflective and a portion 72 that is reflective. The image intended for the audience is digitally reversed and projected on the transflective portion 71, and, therefore, is viewed as a normal image from viewing position 75 (See FIG. 17 which shows the image viewed from the audiences position 75). However, the text 74 as viewed from the front (viewing position 76) now appears reversed. In addition, a non-reversed image is projected on the reflective portion 72 of the screen. This image is only viewed from the front 76 and is not viewable from the audiences position 75. Accordingly, speaker notes, or other information intended for the presenter, but not the audience can be displayed on the front side of the display.

The arrangement of FIG. 16 is particularly well suited for gaming systems, wherein one player is positioned on one side of the screen and the second player is positioned on the other side.

Figure 18:
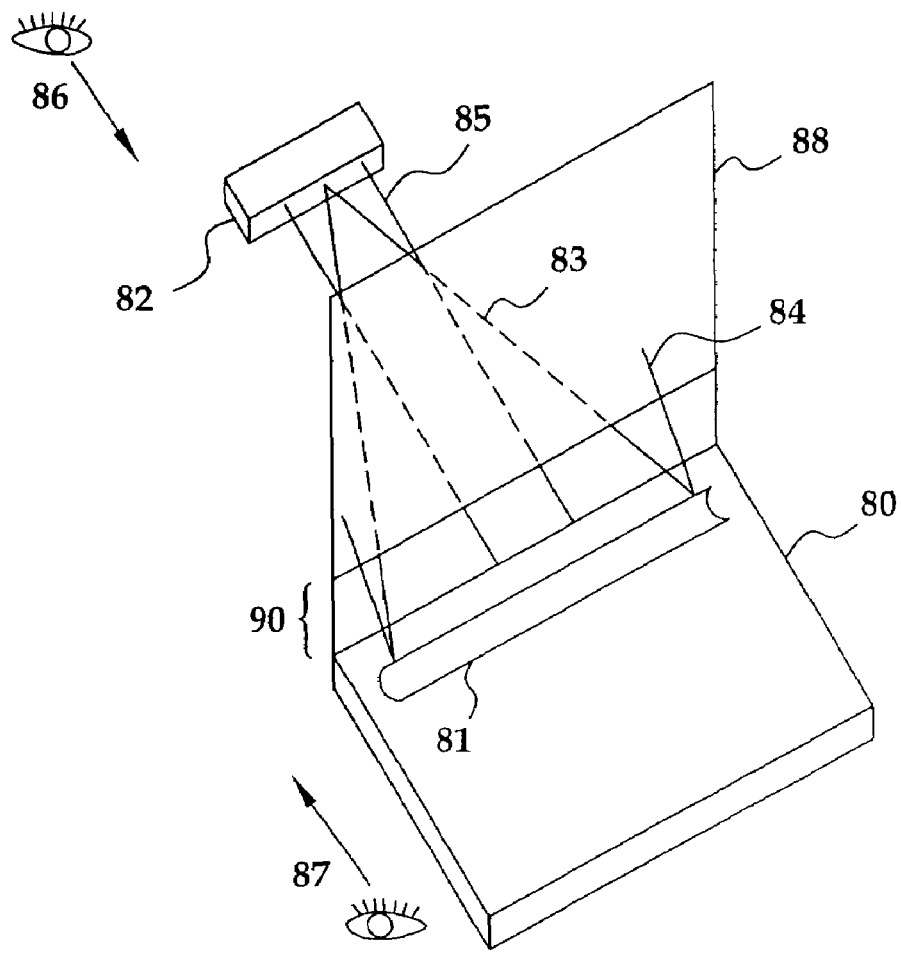
FIGS. 18 and 19 depict a stylized view of an alternative embodiment of a computer system with an LPD and a display screen that is viewable from both front and back sides.
Figure 19:
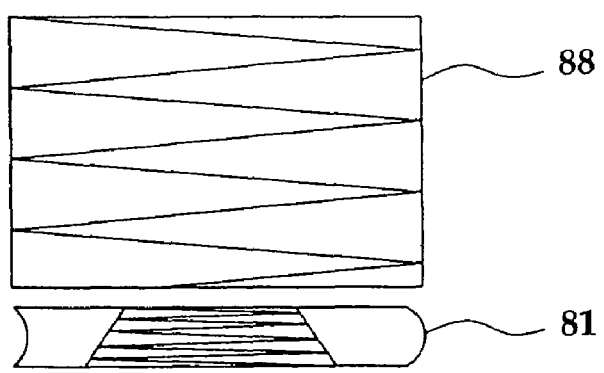

FIG. 18 shows a product 80 having an LPD 82 that is capable of displaying on both sides of a reflective screen 88. The product has a curved mirror 81 mounted in front of the screen. FIG. 19 shows the projection of the laser from the LPD 82 onto the screen 88 and a curved mirror 81 as viewed from viewing position 86. The LPD 82 projects a first image onto the back side of the screen 88 which can be viewed by somebody behind the screen. A good example of this image might be a powerpoint presentation. The LPD 82 also projects a second image which bounces off the mirror 81 and projects on the front side of the screen 88. It should be noted that in this embodiment the shape of the scanning pattern on the scanning mirror 81 is trapezoidal, to provide a rectangular image projected onto the front side of the screen 88. This image can be viewed by a person in front of the screen 88 at viewing position 87. An example of this second image might be speaking notes associated with the powerpoint presentation on the other side of the screen. Accordingly, a two-sided display, having completely different images on each side can be formed by the single LPD 82. This embodiment of the instant invention has particular value in gaming systems, computer systems, portable DVD players, digital cameras, digital videos, etc.

FIG. 19 shows a raster pattern in the event that a curved mirror 81 was used. In this case, the scanning density in the Y direction can be adjusted to be denser when projecting on the curved mirror 81 as compared with the density when projecting on the screen 88. This is readily provided for in a system having an non-resonant Y mirror. The curved mirror 81 would then expand the image and direct it to the front side of reflective screen 88. The trapezoidal shape on the screen 88 can be readily generated digitally by modifying the times at which the lasers are energized during the X scan. As an alternative, a flat mirror could be utilized instead of the curved mirror 81, however, in this case, the size of the mirror would have to be larger, increasing the gap 90 (see FIG. 18) required between the screen 88 and the product 80. In this case, the density of the rastering would be the same when projecting on the screen 88 and the mirror 81.

Figure 20:
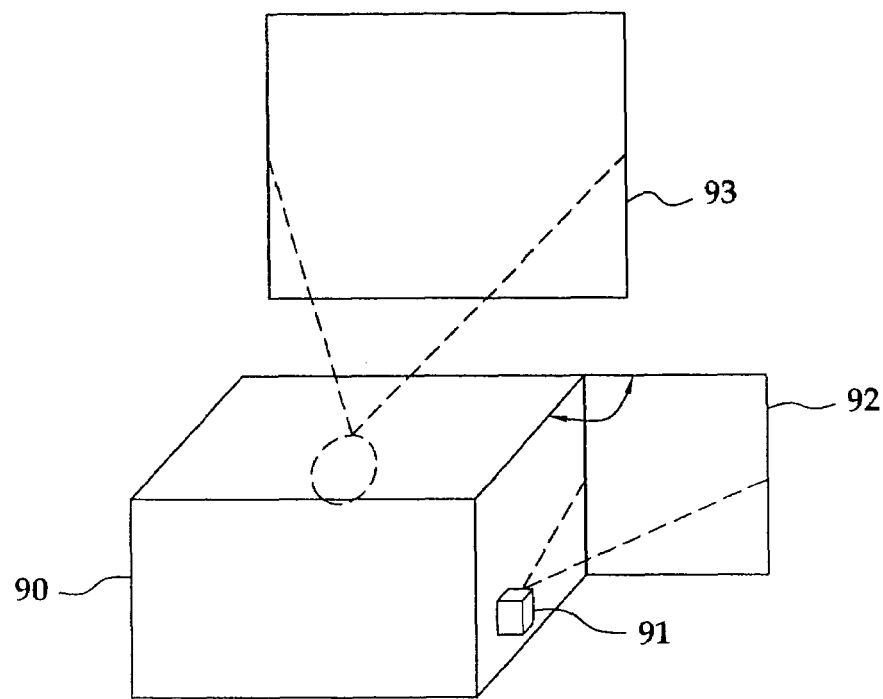
FIG. 20 depicts a stylized view of an LPD based projection system that has public and private display screens illuminated by a common LPD.

FIG. 20 shows another example of a hybrid product. In this case a conventional projection display (such as an in-focus machine) projects images onto a wall 93 for viewing by an audience. Attached to the in-focus machine is an LPD 91 and a screen 92. The LPD 91 projects the speaker notes onto the screen 92. In this way, a presenter can view his/her speaker notes on screen 92 while the audience views the presentation on the wall 93.

Figure 21:
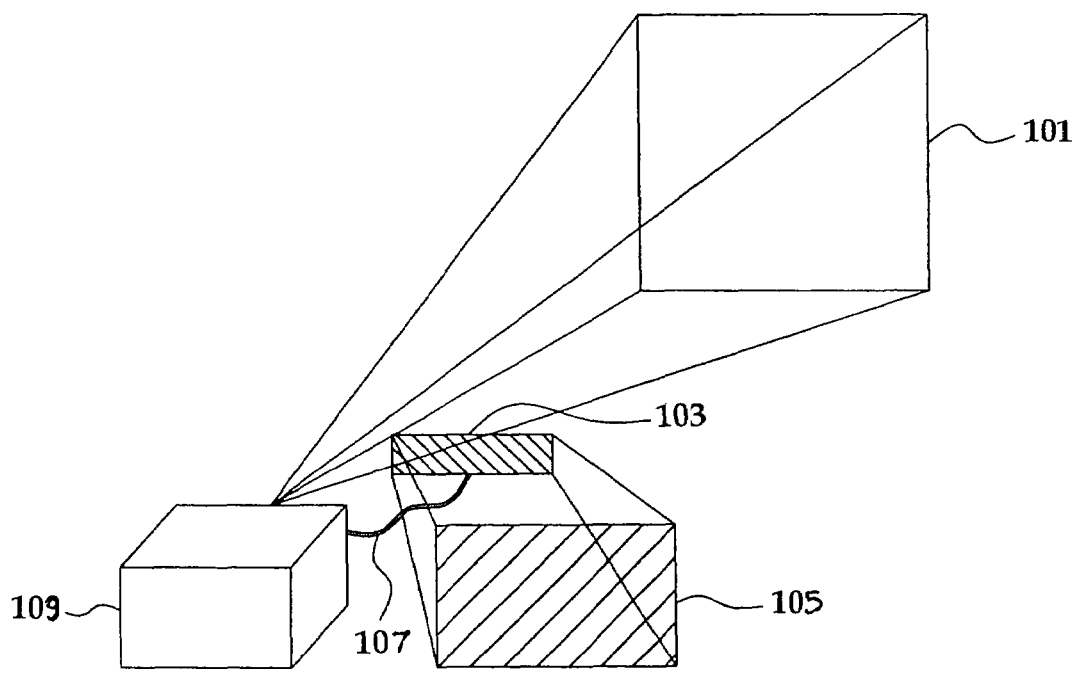
FIG. 21 depicts a stylized view of an alternative embodiment of an LPD based projection system that has public and private display screens illuminated by a common LPD.

FIG. 21 shows another embodiment of the instant invention that is configured to display two different images on different surfaces. In this case, an LPD 109 projects a first image directly on a detached screen 101 or wall. A second image is projected onto a mirror 103, rigidly attached by a mounting bracket 107 to the LPD 109, and is then reflected onto the back of a transmissive screen 105. In the way, utilizing a single LPD 109, a user can project a first image (such as a powerpoint display), onto the wall 101 and a second image (such as speaker notes) onto the screen 105.

Figure 22:
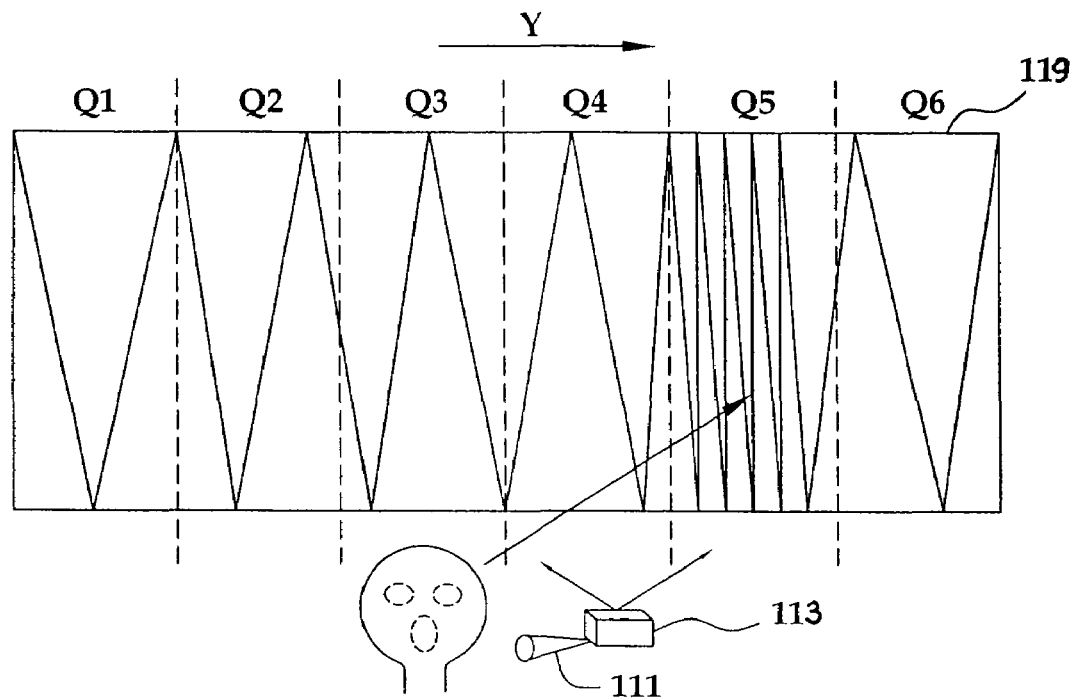
FIG. 22 depicts a large display screen with a plurality of sections that may be illuminated with varying intensity.

FIG. 22 shows an LPD 113 projecting from a distance onto a very large screen 119 or surface. As larger images are projected by the LPD 113, it is common for the LPD 113 to be moved further and further away. For any given ambient light condition, a point is reached where the display is too dim to be practically viewed. However, by turning the LPD sideways, so that the Y scanning axis is along the horizon, due to the non-resonant nature of the Y mirror, selected areas of the screen can be more tightly rastered along the Y scanning axis. For example, breaking the display down into 6 logical sections Q1-Q6, each section can be used to display a different set of information. By way of example, in an office environment, Q1 can display the daily schedule, Q2 can display news of the day, Q3 can display a clock, Q4 can display a computer screen, Q5 can display a phone book, and Q6 can display pictures of the family. Each of the sections Q1-Q6 can be displayed in low resolution until the user selects the particular section for viewing. This selection can be achieved by interacting with a computer driving the LPD 113. When a section is selected for viewing, the rastering in that particular section is increased in frequency, thereby increasing the resolution and overall brightness of the region. In FIG. 22 it is shown that section Q5 is selected for the higher resolution, as indicated by the higher frequency raster scan in that section.

The method of interacting with the computer to determine which screen section provides the higher resolution can be via any of a variety of input devices, such as a mouse, keyboard or can be time based. For example, 5 minutes before an appointment, the section that displays the scheduling information may be displayed in high resolution. As a still further example, when the phone rings, a picture of the caller or information regarding the caller's identitiy can be displayed in high resolution in the section displaying pictures (pictures linked to the caller ID of the caller).

Alternatively, a sensor can be utilized to detect the position of the head to determine the direction the user is facing, and the appropriate section may be selected for high resolution display. In this manner, very large screens can be formed in low resolution, and only those sections being viewed are displayed in higher resolution (and therefore brighter). In this case, the high resolution section may coincide with the head position. There are many known ways to detect the head position of a user. One is to have the user wear a headpiece having two different LEDs spatially separated, and remote fixed sensors detect the relative position of each. Still further, a CCD camera can image the user and calculate the head position.

A still further enhancement is to detect the direction the user is looking as opposed to head positioning. In this case, the high resolution section is set to coincide with the direction of the users gaze. There are several known methods for detecting the direction of a users gaze. One is to use a CCD camera and appropriate image processing software to detect the direction of the gaze. Alternatively, there are techniques used in cameras for detecting the direction a camera user is looking (for setting auto focus parameters). These techniques can be applied to this invention.

Figure 23:
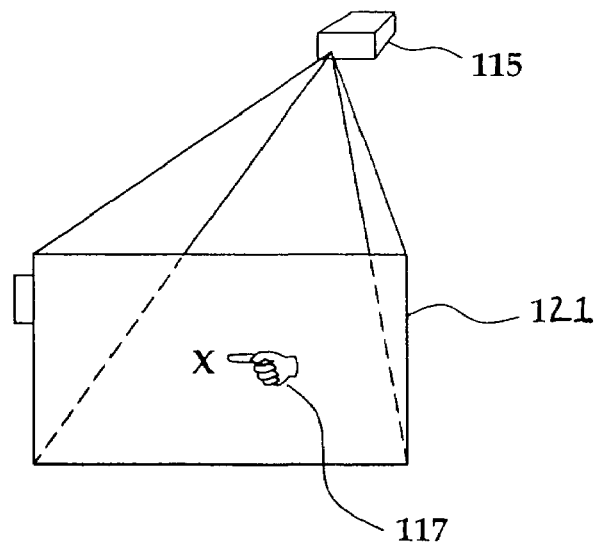
FIG. 23 depicts a display screen illuminated by an LPD that has touch sensitivity.

FIG. 23 illustrates a LPD 115 being utilized to back project an image onto a screen 121, wherein the LPD 115 is arranged to also detect when, and where a user touches the screen. It is known to use two-dimensional rastering lasers to read barcodes and other images. This is accomplished by sensing the reflected laser image off the target (in this case the screen 121). This image sensing can be combined with the image projection to detect when and where an individual touches the screen 121. When the screen 121 is touched, the surface of the screen is deformed and causes the laser light to be reflected differently than when the surface is flat (or not deformed). Processing circuitry associated with the LPD 115 may note the change, and a logical decision can be made that the user is touching the screen at a given location. Further, the amount or pressure applied will affect the magnitude of the deformation, which can be detected by the LPD 115. Accordingly, applications can be written wherein the intensity of the pressure controls aspects of the application.

Figure 24:
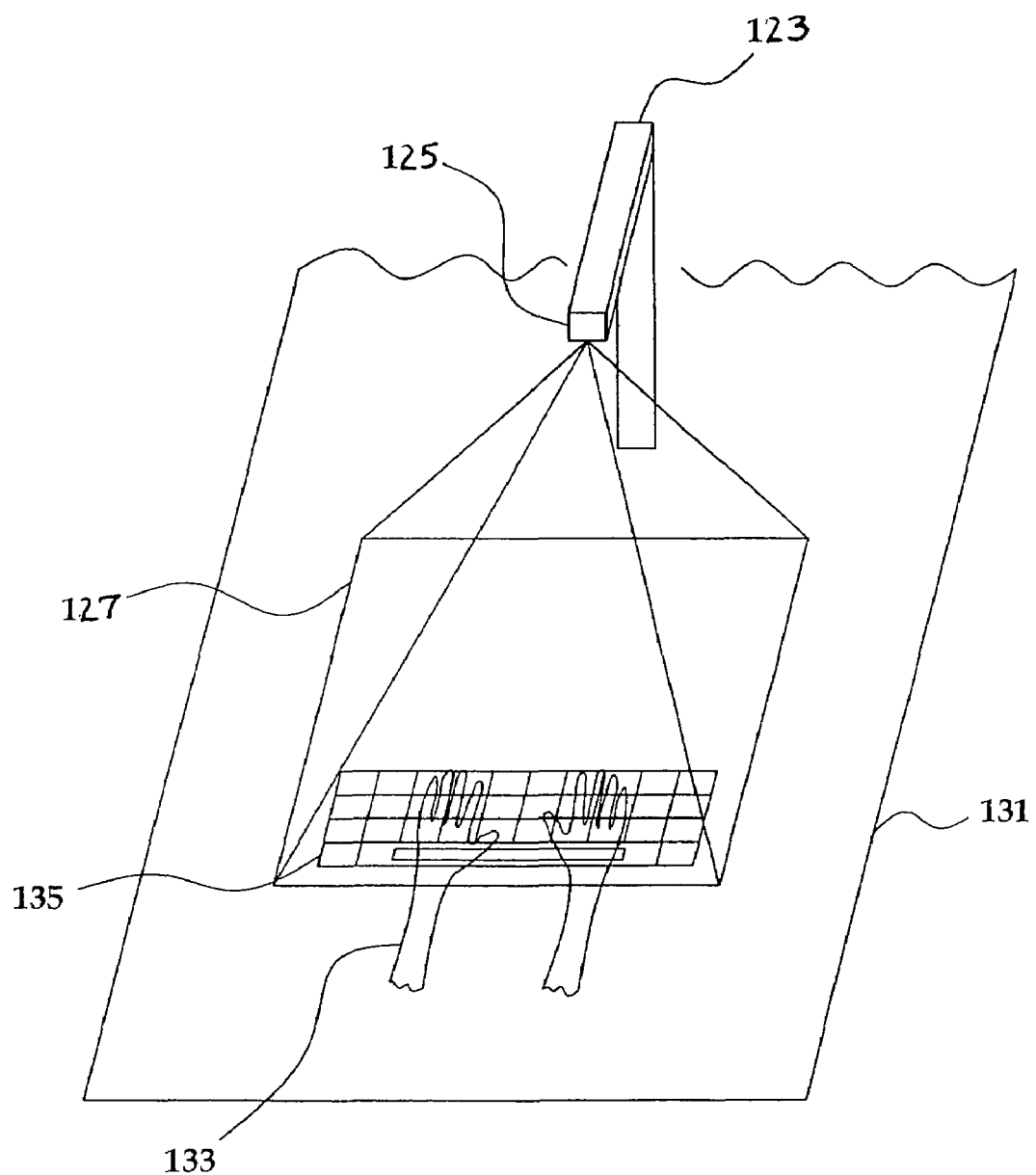
FIG. 24 depicts an LPD projection system for imaging a virtual keyboard.

FIG. 24 shows an LPD 125 that is mounted on a stand 123 and projects an image 127 generally downward onto a horizontal surface 131. The image projected by the LPD consists of a graphical image on a first portion of the surface 131, and a keyboard image 135 on a second portion of the surface 131. As described in reference to FIG. 23, the LPD can be arranged to image (e.g., take a picture) whatever it is projected on. In this embodiment of FIG. 24, the LPD 125 images the position of the users hands 133, and processing logic is applied to determine the position of the hands 133 relative to the projected keys 135. In this way, a virtual keyboard can be implemented. It should be noted that if the LPD 125 is angled to project the image 127 on the surface 131 (at for example a 45 degree angle, the imaging capabilities of the LPD 125 can detect not only the position of the hands relative to the projected keyboard 135, but also the height of each finger above the projected keyboard 135. In this manner, it can be detected when the finger touches the surface 131 to register a key depression.

Figure 25:
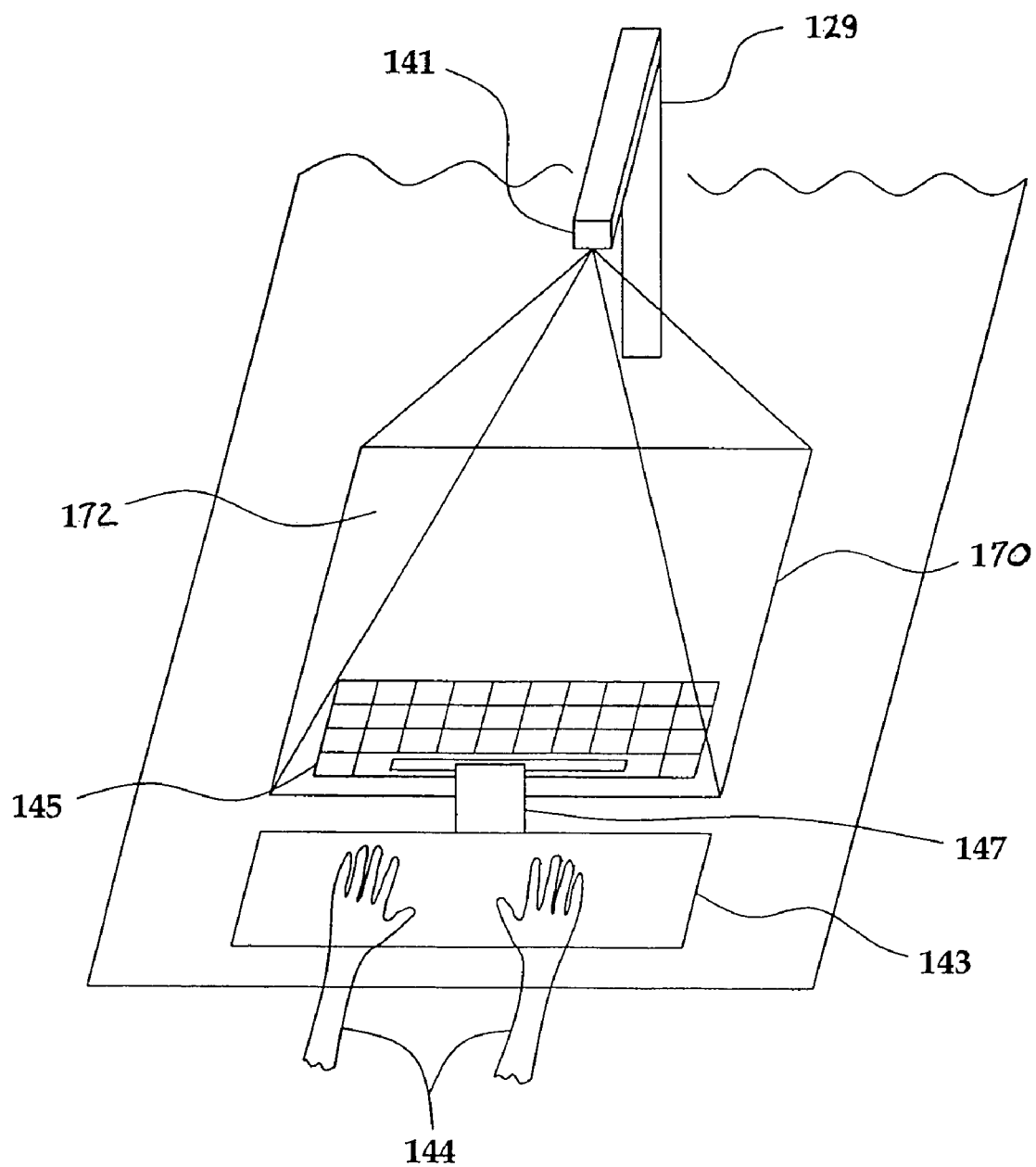
FIGS. 25 and 25A depict alternative embodiments of an LPD projection system for imaging a virtual keyboard.

FIG. 25 shows a further embodiment of a virtual keyboard device. In this example, an LPD 141 is mounted on a stand 129. The LPD 141 projects a graphical image 172 generally downward onto an upper portion of the surface, and a special keyboard/hand image 145 on the lower portion of the display. In this embodiment, a separate CCD camera 147 and processing software is used to detect the position of a user's hands and fingers to determine intended key selection. However, this embodiment differs from the previous virtual keypad in that the user places his hands 144 on a surface below the projected keypad image. As the CCD detects the hand position, processing software formulates a keypad image 145 having an image of the users hands superimposed thereon. Accordingly, as the user types on the blank horizontal surface 143, the keyboard/hand image 145 displays show both the virtual keyboard and a graphical representation of the users hands in area 145. This approach avoids the problem of the user's hands blocking the projected display of the keyboard in FIG. 24. In a still further embodiment of the instant invention, a fixed keypad image can be printed at location 143 of the surface. This would provide information as to where a user should place his/her fingers for each of the keys. The fixed keypad image can be either printed directly onto the surface, or can be a printed pad that can be placed by the user onto the surface.

Figure 25A:
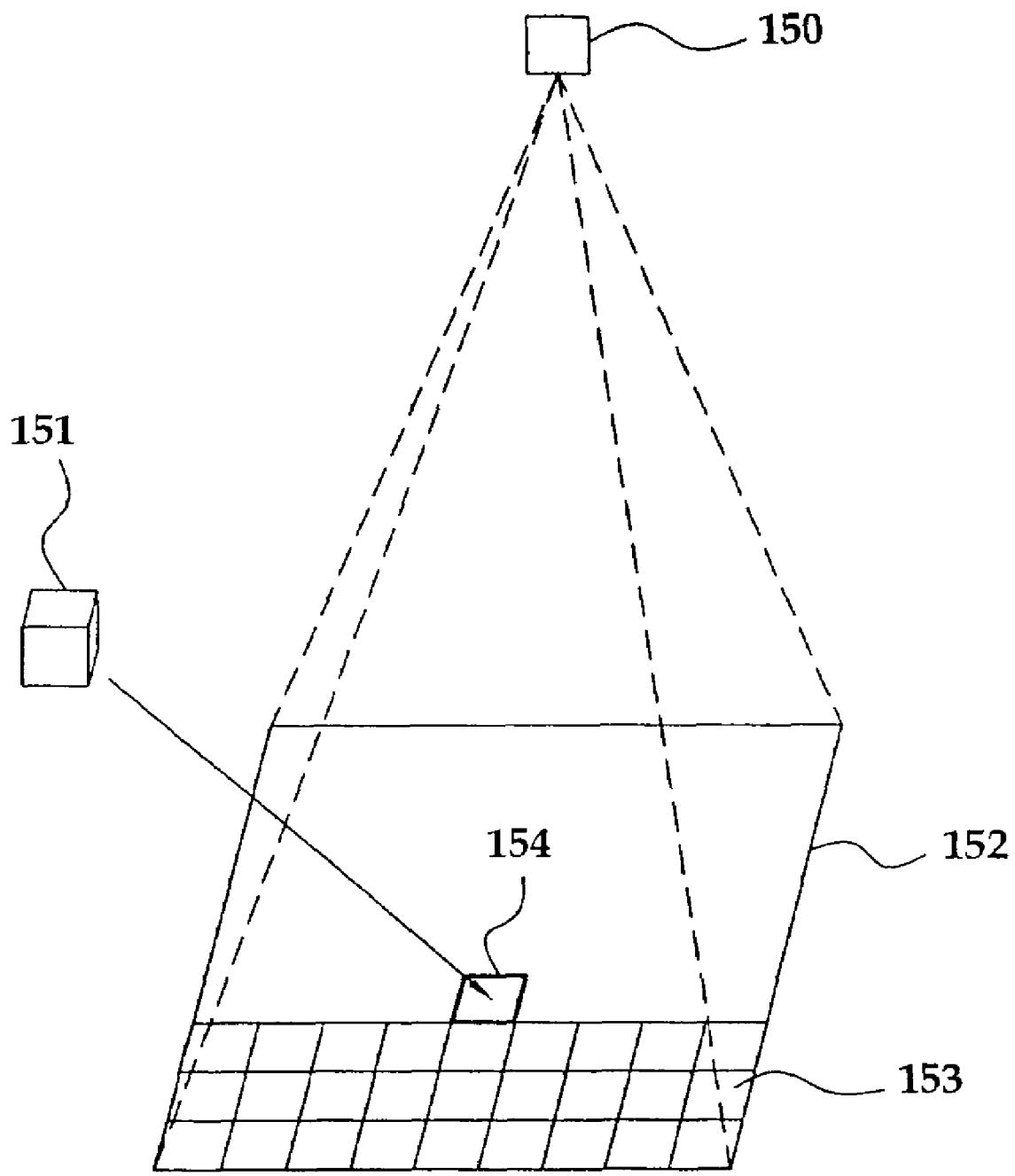

A still further embodiment of the instant invention is shown in FIG. 25A. In this embodiment, a laser projection display 150 combined with a computer processing unit is mounted well above a display area, such as on the ceiling or very high up on a wall or other structure so as to be unobtrusive to a user. The LPD 150 can be focused to project a relatively long distance to a desk or other surface. Using a desk as an illustration, the LPD 150 projects an image onto the desk. The image consists of a graphical part 152 and keypad portion 153. The graphical part 152 can display the information normally displayed on a computer monitor. The Keypad Image 153 can display the text normally preprinted on a computer keyboard. Additionally, a placement marker 154 can be projected onto the surface indicating where a user can place a finger position sensor 151. When put in place, the finger position sensor 151 can detect where a user's fingers are located and when the fingers are brought down to touch the desk surface. In this way, the finger position sensor 151 can detect which keys the user typed. The finger position sensor 151 can be similar to that currently available from Canesta. In such a case, the finger position sensor 151 includes an image capture device and a sensor for detecting when the fingers breaks a horizontal plane on the surface of the desk. By incorporating a wireless transmitter into the finger position sensor 151 that communicates to the LPD computer 150 in the ceiling, each simulated key depression can be provided to the LPD computer 150, and therefore, both the monitor and keypad normally associated with a desktop computer can be completely eliminated.

As a still further embodiment of the invention of FIG. 25A, the finger position sensor 151 can be simplified by utilizing the image capability of the LPD computer 150 to detect the position of the users hands over the projected keyboard area 153. To detect whether the user intended to press a key, the finger position detector 151 can be greatly simplified so that it contains only the circuit and sensor for detecting when the fingers break a horizontal plane on the surface of the desk. There is no need for an additional imaging device contained in 151. In this embodiment, since the finger position sensor 151 merely has to detect whether the fingers break a horizontal plane, the sensor 151 can be located outside of the projected image. For example the sensor 151 can be at the edge of the desk or mounted on a wall next to the desk.

Figure 26A:
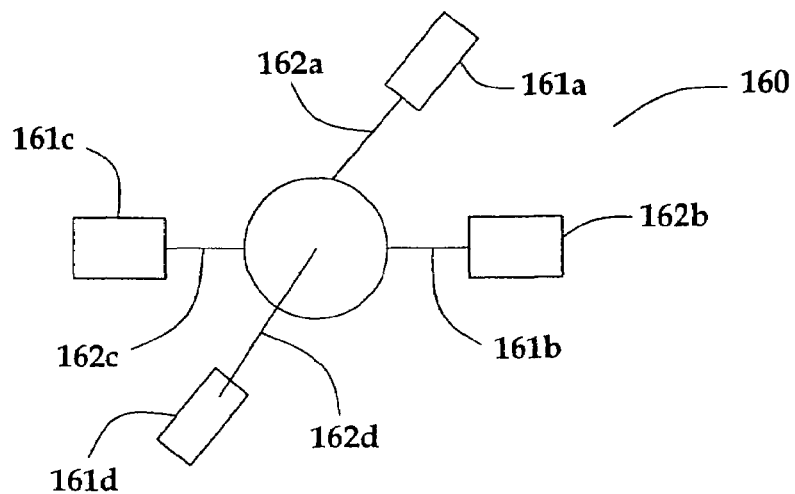
FIGS. 26A and 26B depict a multi-LPD projection system.
Figure 26B:
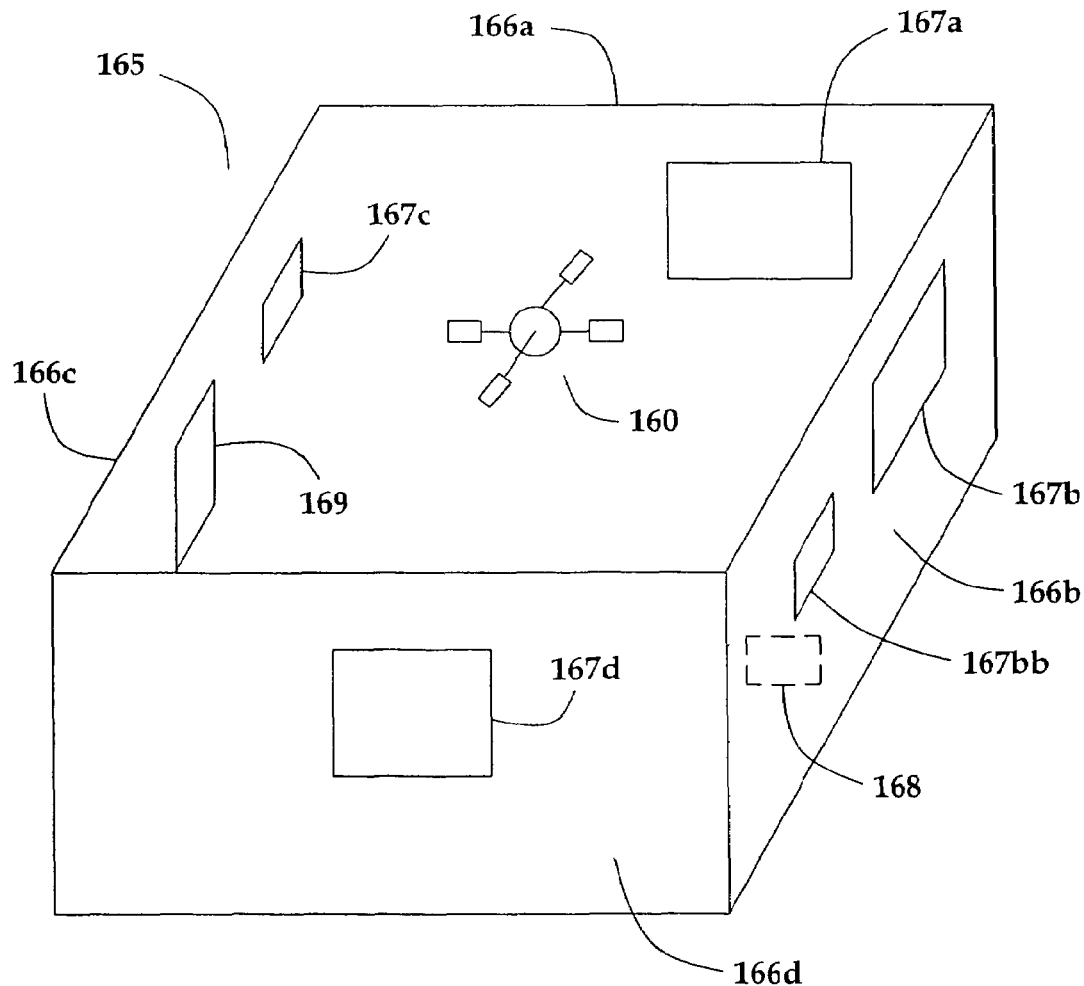

FIGS. 26A and 26B show a cluster 160 of four independent LPDs 161(a-d) mounted on articulating arms 162(a-d). Each articulating arm 162(a-d) can be computer controlled so as to variably aim the LPDs 161(a-d) at different locations. The computer (not shown) connects to the cluster 160 and controls the image projected by each LPD 161(a-d), as well as the positions of the articulating arms 162(a-d) (the aim). Referring to FIG. 26B, the cluster 160 is mounted on the inside of the ceiling of a room 165. Each of the four independent LPDs 162(a-d) face generally towards walls 166(a-d), respectively. Each of the independent LPDs 162 (a-d) can project an independent image on the respective walls 166(a-d). The projected image can be dynamically changed, with respect to content, location and size, as a function of the activity within the room. For example, assume that a desk 168 is positioned near the wall 166b. The LPD 162b can be aimed at the wall 166B at a position immediately above a top edge of the desk 168 and a image of a computer screen 167bb can be projected. Accordingly, when a user sits at the desk, a virtual computer screen can be displayed. Concurrently, the LPD 162d can project a virtual image 167d (such as a painting or picture) on the wall 166d, while the LPD 162a projects another virtual image 167a (such as a TV image) on the wall 166a. Finally, assuming that there is an exit door 169 on the wall 166c, a display image 167C representative of a burglary and/or fire alarm system can be projected on the wall 167C. Accordingly, in the illustrated embodiment of the instant invention, multiple different types of displays can be simultaneously projected. The projected images are not limited to those types disclosed in this specific embodiment.

The images 167(a-d) can vary as a function of time, external events, user initiated requests, and the like. For example, during the day the painting projected can be one suitable for children, such as cartoon characters, and in the evening, the paintings projected can be suitable for adults. Alternatively, depending upon the time of year, appropriate seasonal or holiday images can be displayed. Still further, on birthdays, images of the birthday family member can be displayed.

An exemplary scenario in which images may be varied as a function of external events is discussed below. The computer controlling the images can be informed, by keypad input or otherwise, as to who will be visiting the house, and the images to be projected by the LPDs selected appropriately. For example, if the computer is informed that your mother-in-law is visiting, the computer can be programmed to project pictures of your mother-in-law with the grandchildren. Alternative external triggered events, such as stock prices or weather warnings, can be set to change the projected image. For example, the projected image can be initially a work of art, however, when a weather warning is received by the computer, the image can change to display a local weather station. Still further, upon informing the computer of the weather conditions outside, the images can be varied as predetermined. For example, if it is raining outside, sunny images can be displayed; if it is hot outside, images of the ski slopes can be displayed. Still further, occupants of the house can carry remote controls (IR or wireless) that communicate directly with the computer controlling the LPDs to set the aiming direction and the content of the images projected by the LPDs. For example, when a user is at the refrigerator, the user can request an image projected on the refrigerator displaying recipe ingredients, so that the user remembers to remove the appropriate items. When the door bell to the house ring, the user can request that an image displaying the person at the front door be projected on the nearest wall to them.

Finally, the Laser Projection Displays of FIG. 26B can be configured as imaging devices for taking pictures of the contents of the room. The images can be used to determine the location of the people within the room and accordingly, adjust the position, content and size of the projected images to best fit the location of those in the room. Still further, the images within the room captured by the laser projection displays can be used for surveillance, thereby eliminating the need to have additional surveillance cameras. As a further embodiment, people within a room can wear location tags, which report their location to a computer driving the Laser Projection displays. Existing location systems exist that work within 802.11 networks (TDA—time difference or arrival systems, and RSSI—signal strength systems).

Figure 27A:
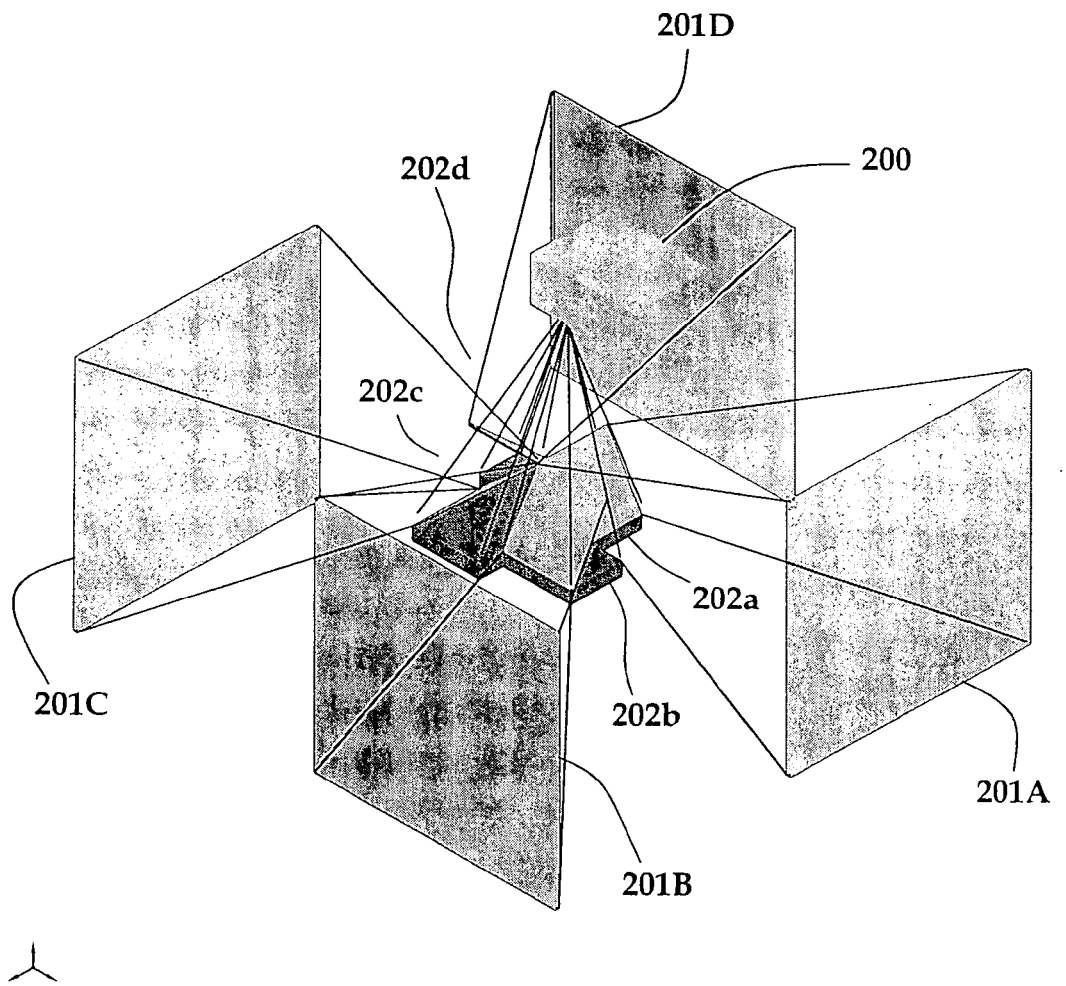
FIGS. 27A-27C depict an LPD projection system capable of back illuminating a plurality of display screens with a common LPD.
Figure 27B:
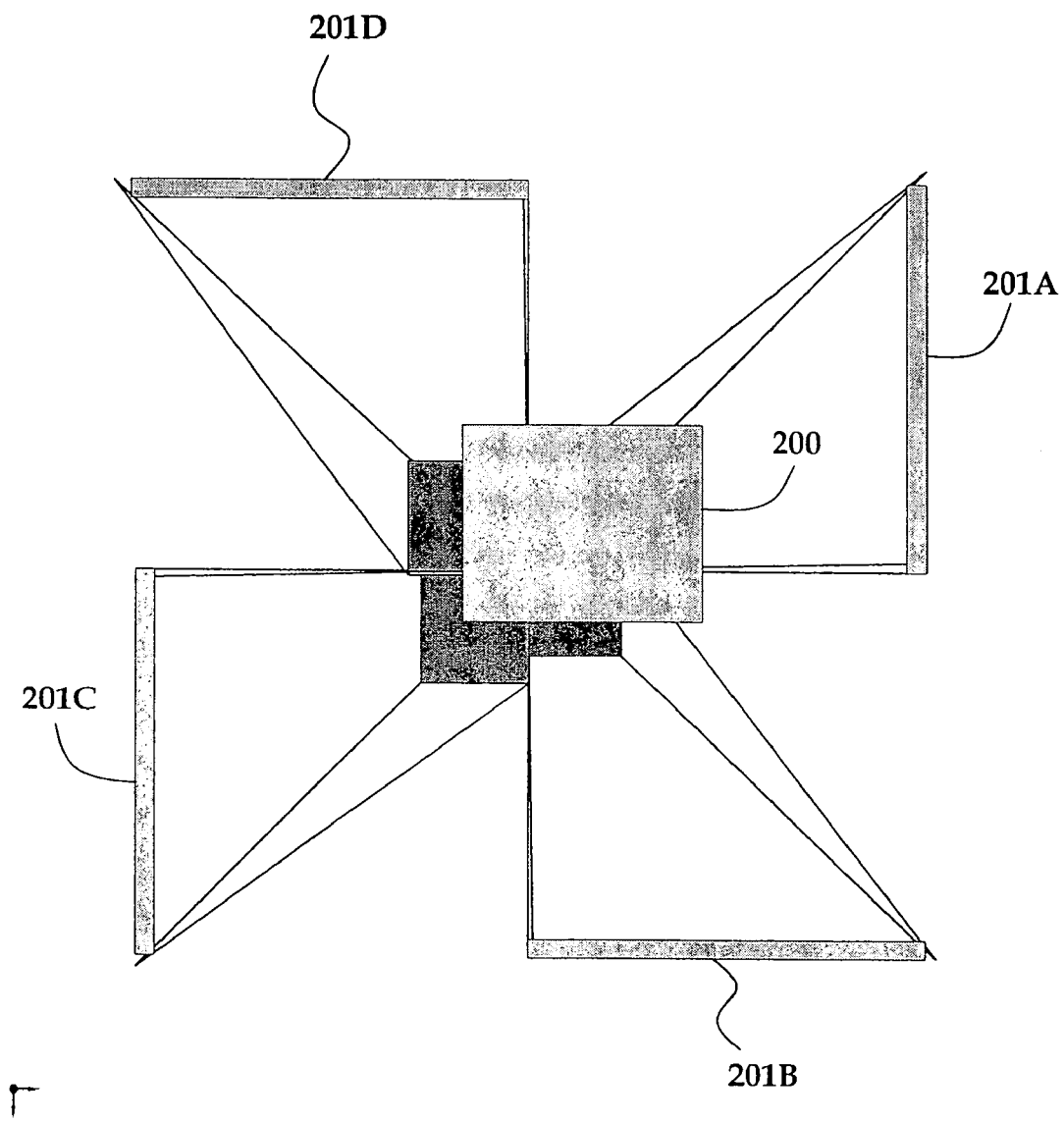

FIGS. 27A and 27B show a display in which one laser projector 200 projects displays on four independently viewed screens. In this embodiment, an LPD 200 projects an XGA color image (1024 by 768 pixels) onto four equally sized mirrors 202a-202d, each of which reflects one-fourth of the image (512 by 384 pixels) onto one of four individual screens 201a-201d. Each of the screens is made of a surface that allows the image to be viewed from the back side of the screen. A variety of materials, such as latex, may be employed as the screen material. In this arrangement, each of four viewers can view independent images projected by a single LPD.

Figure 27C:
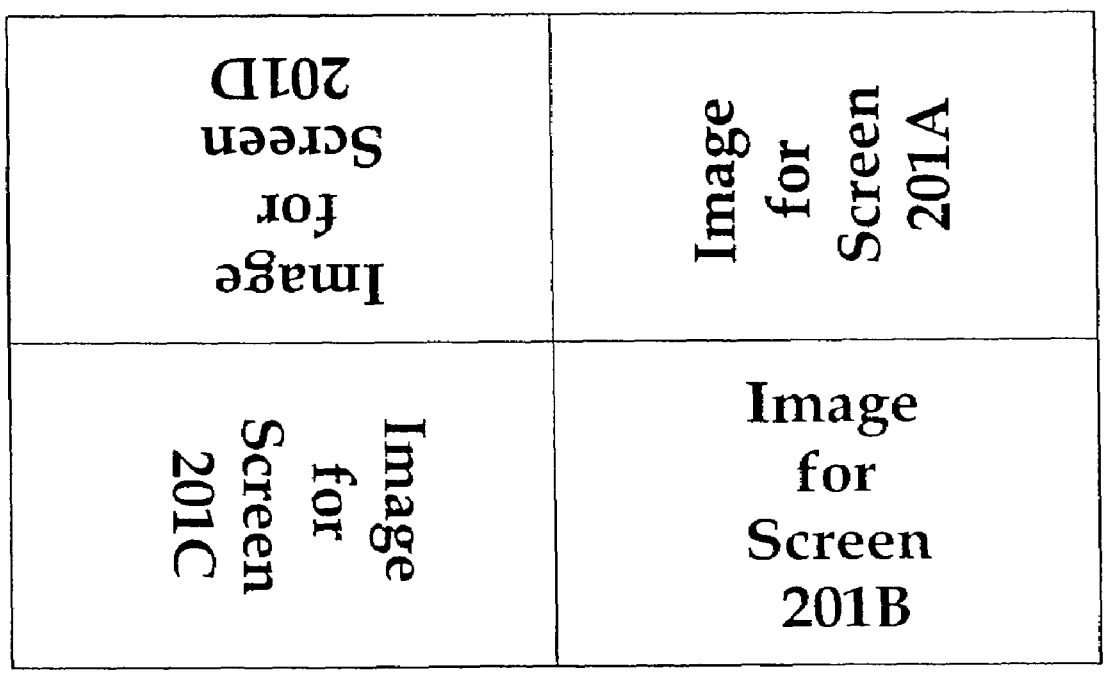

FIG. 27C shows an arrangement of an XGA color image projected by the LPD 200. In the illustrated embodiment, the four individual viewing areas are oriented so that the image appears rightsided when it is reflected by the mirrors onto each of the four screens.

One use of this invention of FIGS. 27A-C is in advanced gaming systems. The resolution of each of the resulting four screens is enough to allow advanced gaming applications. Accordingly, one use of the invention of FIG. 21 is to connect the LPD projector to a gaming system (example, a Game Cube, Nintendo, Game Boy, or PC with a gaming application), wherein the gaming system is arranged to have four separate gaming control inputs (one for each of four users). The gaming program allows four players to simultaneous play a game having four different graphic displays. The gaming system provides a single XGA output image to the LPD, wherein each or the users display is in one quarter of the XGA output, and is reflected to the appropriate screen of each user by the mirrors. The gaming system can be arrange to allow each of the users to participate interactively in a single game (where each user has their own view of the game), or alternatively, one or more players can play independent games simultaneously.

While the invention of FIGS. 27A-C shows four mirrors and four screens, the invention is not limited thereto. Any number of mirrors and screens can be utilized. The program controlling the output of the LPD has to be adjusted accordingly to insure the desired image falls on each of the mirror surface. Further, several of the mirrors and screens can be of different sizes, having different pixel resolutions. Once again, the program controlling the output of the LPD has to be adjusted accordingly to compensate. Still further, given the non-resonant nature of the Y mirror, some of the mirrors can have denser images projected thereon by the LPD, and therefore project a higher resolution image onto their respective screens.

A still further use for the invention of FIGS. 27A-C is to utilize the device as 4 monitors. For example, in schools, the four sided display could be placed on a square desk, and each student would utilize one of the respective screens. In this example, four independent keypads and mice would connect to a single computer, which in turn runs four independent programs (one for each of the users). A composite XGA image is formed and provided to the LPD, wherein one quarter of the image is provided through the mirrors to each of the four respective screens. Accordingly, due to the sharing of the computer and the LPD, very cost effective solutions can be deployed.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the control units cause the corresponding system to perform programmed acts.

The particular embodiments disclosed herein are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. An arrangement for projecting an image, comprising:
   a) a laser source for generating a laser beam;
   b) a scanner for sweeping the laser beam at a first scan rate to generate a scan line having pixels arranged along a first direction, and for sweeping the scan line at a second scan rate along a second direction orthogonal to the first direction to generate a raster pattern of scan lines on a projection surface; and
   c) a controller for energizing the laser source to illuminate selected pixels on the scan lines to form the image on the projection surface, and for controlling the scanner to vary at least one of the scan rates during sweeping to form a plurality of image regions of different pixel resolution on the projection surface.

2. The arrangement of claim 1, wherein the laser source is a laser; and wherein the scanner includes a first oscillatable scan mirror driven by the controller at the first scan rate, and a second oscillatable scan mirror driven by the controller at the second scan rate, the scan rates being different.

3. The arrangement of claim 1, wherein the laser source includes a plurality of lasers for respectively generating constituent beams which are combined to form the laser beam; and wherein the scanner includes a first oscillatable scan mirror driven by the controller at the first scan rate, and a second oscillatable scan mirror driven by the controller at the second scan rate, the scan rates being different.

4. The arrangement of claim 1, wherein the controller is operative for controlling the scanner to form the image regions as discrete areas lying in a common plane, and spaced apart from each other, on the projection surface.

5. The arrangement of claim 4, wherein the projection surface is a single screen.

6. The arrangement of claim 4, wherein the projection surface is a plurality of screens.

7. The arrangement of claim 1, wherein the controller is operative for controlling the scanner to form the image regions as discrete areas lying in intersecting planes, and spaced apart from each other, on the projection surface.

8. The arrangement of claim 1, wherein the scanner sweeps the laser beam over a scan angle to generate the scan line with a length dimension, and wherein the controller is operative for controlling the scanner to vary the scan angle and change the length dimension of the scan line.

9. The arrangement of claim 1, wherein the controller is operative for controlling the scanner to form the image regions as discrete areas lying in parallel planes, one of the planes being closer to the laser source than the other of the planes.

10. The arrangement of claim 1, wherein one of the image regions depicts a keyboard, and another of the image regions depicts a graphical user interface.

11. A method of projecting an image, comprising the steps of:
    a) generating a laser beam from a laser source;
    b) sweeping the laser beam at a first scan rate to generate a scan line having pixels arranged along a first direction, and sweeping the scan line at a second scan rate along a second direction orthogonal to the first direction to generate a raster pattern of scan lines on a projection surface; and
    c) energizing the laser source to illuminate selected pixels on the scan lines to form the image on the projection surface, and varying at least one of the scan rates during sweeping to form a plurality of image regions of different pixel resolution on the projection surface.

12. The method of claim 11, wherein the laser source is a laser; and wherein the sweeping step includes driving a first oscillatable scan mirror at the first scan rate, and driving a second oscillatable scan mirror at the second scan rate, the scan rates being different.

13. The method of claim 11, wherein the laser source includes a plurality of lasers for respectively generating constituent beams which are combined to form the laser beam; and wherein the sweeping step includes driving a first oscillatable scan mirror at the first scan rate, and driving a second oscillatable scan mirror at the second scan rate, the scan rates being different.

14. The method of claim 11, wherein the varying step is performed by forming the image regions as discrete areas lying in a common plane, and spaced apart from each other, on the projection surface.

15. The method of claim 14, and forming the projection surface as a single screen.

16. The method of claim 14, and forming the projection surface as a plurality of screens.

17. The method of claim 11, wherein the varying step is performed by forming the image regions as discrete areas lying in intersecting planes, and spaced apart from each other, on the projection surface.

18. The method of claim 11, wherein the sweeping step sweeps the laser beam over a scan angle to generate the scan line with a length dimension, and wherein the varying step is performed by varying the scan angle and changing the length dimension of the scan line.

19. The method of claim 11, wherein the varying step is performed by forming the image regions as discrete areas lying in parallel planes, one of the planes being closer to the laser source than the other of the planes.

20. The method of claim 11, and forming one of the image regions as a keyboard, and forming another of the image regions as a graphical user interface.

* * * * *